(12) United States Patent
Xie et al.

(10) Patent No.: US 12,398,994 B1
(45) Date of Patent: Aug. 26, 2025

(54) OPTICAL FIBER-TYPED SPECTRAL CONFOCAL COHERENCE TOMOGRAPHY OPTICAL SYSTEM AND APPLICATION THEREOF

(71) Applicant: Guangdong University of Technology, Guangdong (CN)

(72) Inventors: Shengli Xie, Guangdong (CN); Bo Dong, Guangdong (CN); Zhun Wang, Guangdong (CN); Zihao Ni, Guangdong (CN); Yulei Bai, Guangdong (CN); Victor Fedorovich Kuzin, Moscow (RU)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/984,931

(22) Filed: Dec. 17, 2024

(30) Foreign Application Priority Data

May 16, 2024 (CN) .......................... 202410606471.0

(51) Int. Cl.
*G01B 9/02091* (2022.01)
*G01B 9/02* (2022.01)
*G01B 9/02015* (2022.01)

(52) U.S. Cl.
CPC ....... *G01B 9/02091* (2013.01); *G01B 9/0203* (2013.01); *G01B 9/02042* (2013.01); *G01B 9/02084* (2013.01)

(58) Field of Classification Search
CPC .............. G01B 9/0203; G01B 9/02042; G01B 9/02084; G01B 9/02091
See application file for complete search history.

(56) References Cited

U.S. PATENT DOCUMENTS

| | | | |
|---|---|---|---|
| 8,508,748 B1* | 8/2013 | Manassen | G01N 21/4795 356/479 |
| 2017/0290514 A1* | 10/2017 | Liu | G01B 9/02084 |

(Continued)

FOREIGN PATENT DOCUMENTS

| | | | | |
|---|---|---|---|---|
| CN | 109984722 A | | 7/2019 | |
| CN | 117109450 A | | 11/2023 | |
| CN | 117109450 B | * | 5/2024 | ......... G01B 11/0675 |

OTHER PUBLICATIONS

"Highly sensitive, wide dynamic range displacement sensor combining chromatic confocal system and phase-sensitive spectral optical coherence tomography" Bo Dong et al., Optics Express, vol. 25.No 5. p. 1-5; Mar. 6, 2017.

*Primary Examiner* — Michael A Lyons (57) ABSTRACT

The present application provides an optical fiber-typed spectral confocal coherence tomography optical system and an application thereof. The system includes an optical fiber coupler, a broadband light source, a reference component, a sample component and a spectrometer. The reference component is connected to a first output end of the optical fiber coupler, for receiving a light source signal emitted by the optical fiber coupler and controllably forming the light source signal into an interference signal. The sample component is connected to a second output end of the optical fiber coupler, for receiving the light source signal emitted by the optical fiber coupler and forming a spectral confocal signal after the light source signal passes through a sample to be tested. The spectrometer is connected to a third output end of the optical fiber coupler.

9 Claims, 10 Drawing Sheets

(56) References Cited

U.S. PATENT DOCUMENTS

2021/0088327 A1\* 3/2021 Tao .................... G01M 11/025
2024/0035810 A1\* 2/2024 Manassen ......... H01L 21/67288

\* cited by examiner

OPTICAL FIBER-TYPED SPECTRAL CONFOCAL COHERENCE TOMOGRAPHY OPTICAL SYSTEM AND APPLICATION THEREOF

CROSS-REFERENCE TO RELATED APPLICATION

This application claims priority of Chinese Patent Application No. 202410606471.0, filed on May 16, 2024, the entire contents of which are incorporated herein by reference.

TECHNICAL FIELD

The present application relates to optical systems, and in particular to an optical fiber-typed spectral confocal coherence tomography optical system and an application thereof in measurement of thickness and refractive index of thin polymer films.

BACKGROUND

With the rapid advancement of modern manufacturing, precision measurement technology is increasingly crucial, and the measurement of thin polymer film thickness and refractive index that represent the fundamental physical properties of optical materials is essential in optimizing material performance, accurately designing optical devices, strictly controlling product quality, and ensuring product consistency.

However, there are many limitations for existing measurement technologies to meet these requirements. For contact measurement method, although feasible in direct measurement, it poses a risk of damaging optical materials and fails to meet the requirements for high-precision measurement. For non-contact measurement method, it involves the problem that the signal-to-noise ratio required by thickness information acquisition is lower, although it has no physical damage to the material. Therefore, achieving non-contact and high-precision measurement of optical materials is of great significance for their production and application.

Existing chromatic confocal coherence tomography (CCCT) system and method combine spectral confocal and optical coherence tomography (OCT) technologies to measure the thickness and refractive index of translucent materials through a single shot. In this measurement system, measurement signal contains both confocal and interference information. The confocal signal manifests as two non-interference dispersing peaks formed by light reflected from two surfaces of a sample. By low-pass filtering of signal, high-frequency interference components can be removed to obtain the confocal signal, and a confocal thickness ($d_{conf}$) is obtained based on the difference in peak positions. The interference signal is generated from the optical path difference between the sample surface and a reference lens, manifesting as frequency variations in the frequency domain. By high-pass filtering of signal, low-frequency confocal components are removed to obtain the interference signal, which under each peak is subjected to Fourier transform to obtain an amplitude-frequency diagram, and $d_{int}$ is further obtained. Finally, the geometric thickness and refractive index are obtained by combining the derived thickness solution formula.

However, the existing technologies represented by CCCT technology involve that a signal formed by the superposition of confocal signal and interference signal is firstly acquired, and then the two signals are filtered based on their frequency differences. Accordingly, both the resulted confocal signal and interference signal have a low signal-to-noise ratio, resulting in the measurement accuracy and sensitivity failing to meet theoretical expectations. Additionally, the principle of interference is the same as that of spectral-domain OCT, with tomographic resolution being positively correlated with bandwidth. Therefore, if the confocal signal and interference signal are superimposed, the confocal signal effectively windows the interference signal in the spectral domain, reducing the actual bandwidth of the interference signal by an order of magnitude. Consequently, the tomographic resolution after processing is reduced to nearly one-tenth of the light source bandwidth, leading to a low signal resolution.

Based on this, there is an urgent need to develop an optical fiber-typed spectral confocal coherence tomography optical system that can enhance signal-to-ratio and resolution of signals.

SUMMARY

The present application provides an optical fiber-typed spectral confocal coherence tomography optical system and an application thereof, which can improve both the resolution and signal-to-noise ratio of signals, thereby enhancing measurement accuracy and sensitivity.

Specifically, the present application provides the following technical solutions.

An optical fiber-typed spectral confocal coherence tomography optical system includes:
  an optical fiber coupler;
  a broadband light source, connected to an input end of the optical fiber coupler, for providing a light source signal;
  a reference component, connected to a first output end of the optical fiber coupler, for receiving the light source signal emitted by the optical fiber coupler and controllably forming the light source signal into an interference signal;
  a sample component, connected to a second output end of the optical fiber coupler, for receiving the light source signal emitted by the optical fiber coupler and forming a spectral confocal signal after the light source signal passes through a sample to be tested; and
  a spectrometer, connected to a third output end of the optical fiber coupler, for firstly receiving the spectral confocal signal, then receiving a total output signal obtained from the superposition of the interference signal and the spectral confocal signal, and achieving signal separation according to the spectral confocal signal and the total output signal to enhance a signal-to-noise ratio and resolution of signals.

The reference component includes:
  a first lens, arranged near the first output end of the optical fiber coupler, for receiving the light source signal;
  a light shutter, arranged at an end of the first lens away from the first output end of the optical fiber coupler, for controllable closing/opening; and
  a second lens, arranged at an end of the light shutter away from the first lens, for outputting the interference signal when the light shutter is opened.

The sample component includes:
  a dispersing lens, arranged near the second output end of the optical fiber coupler, for receiving the light source signal; and
  a movable platform, arranged at an end away from the dispersing lens, for holding the sample to be tested and displacing the sample to be tested along an axial direction of the dispersing lens.

The spectrometer and the optical fiber coupler are connected to obtain the interference signal through the following steps:
  a broadband light signal emitted by the broadband light source entering the reference component; and
  opening the light shutter in the reference component, allowing the broadband light to enter the reference component to obtain the interference signal, and outputting the interference signal to the spectrometer.

An intensity signal of the interference signal is expressed as:

$$2\sum_{j=1}^{M} \sqrt{I_R I_j} \cos\left(\phi_{j0} + \frac{4\pi}{\lambda} d_{intj}\right),$$

where $\lambda$ represents a wavelength; M represents the number of surfaces of the sample to be tested; j represents a $j_{th}$ surface of the sample to be tested; $I_R$ and $I_j$ represent intensities of light reflected from a reference surface and a surface of the sample to be tested, respectively; $\phi_{j0}$ represents an initial phase of the interference signal; $d_{intj}$ represents an optical depth corresponding to the $j_{th}$ surface of the sample to be tested.

The spectrometer, connected to a third output end of the optical fiber coupler, for firstly receiving the spectral confocal signal, then receiving a total output signal obtained from the superposition of the interference signal and the spectral confocal signal, and achieving signal separation according to the spectral confocal signal and the total output signal includes:
  broadband light emitted by the broadband light source entering the reference component and the sample component;
  closing a light shutter in the reference component, preventing the broadband light from entering the reference component while allowing the broadband light to only enter the sample component to form the spectral confocal signal;
  opening the light shutter in the reference component, allowing the broadband light to enter the reference component to obtain the interference signal; and
  superimposing the interference signal and the spectral confocal signal to obtain the total output signal, and outputting the total output signal to the spectrometer.

The total output signal is expressed as:

$$I_o(\lambda) = \sum_{j=1}^{M}\left[\frac{\pi a^2}{\lambda(d_{conf0} + b\lambda_j)}\mathrm{sinc}\left(\frac{\pi a^2 b(\lambda - \lambda_j)}{2\lambda(d_{conf0} + b\lambda_j)^2}\right)\right]^4 \times$$

$$2\sum_{j=1}^{M} \sqrt{I_R I_j}\cos\left(\phi_{j0} + \frac{4\pi}{\lambda}d_{intj}\right)$$

where $I_o$ represents the total output signal; $\lambda$ represents the wavelength; M represents the number of surfaces of the sample to be tested; j represents the $j_{th}$ surface of the sample to be tested; $d_{conf0}$, a, and b represent parameters of a dispersing lens; $\lambda_j$ represents a wavelength corresponding to the $j_{th}$ surface of the sample to be tested; $I_R$ and $I_j$ represent the intensities of the light reflected from the reference surface and the surface of the sample to be tested, respectively; $\phi_{j0}$ represent the initial phase of the interference signal; and $d_{intj}$ represents the optical depth corresponding to the $j_{th}$ surface of the dispersing lens.

The achieving signal separation according to the spectral confocal signal and the total output signal includes:
  using the opening/closing of the light shutter in the reference component to obtain the total output signal/spectral confocal signal, respectively; and
  obtaining the interference signal by dividing the total output signal by the spectral confocal signal, and using a covariance method to perform signal model fitting and autocorrelation calculation to achieve high-resolution frequency estimation and signal separation.

An application of the above-described optical fiber-typed spectral confocal coherence tomography optical system includes:
  using the opening/closing of the light shutter in the reference component to obtain the total output signal/the spectral confocal signal, respectively;
  obtaining the interference signal by dividing the total output signal by the spectral confocal signal to achieve signal separation; and
  obtaining a confocal thickness and an optical thickness of the sample to be tested by peak searching in a wavenumber domain of the spectral confocal signal and a frequency domain of the interference signal, respectively, and obtaining a physical thickness and a refractive index of the sample to be tested.

The application includes:
  setting the confocal thickness as $t_{conf}=d_{conf2}-d_{conf1}$ and the optical thickness as $t_{int}=d_{int1}-d_{int2}$ for the sample to be tested; and
  obtaining the physical thickness t and the refractive index n of the sample to be tested according to the physical relationship expressed in the following formula:

$$t = \left\{\frac{NA^2 t_{conf}^2 - [NA^4 t_{conf}^4 + 4(1 - NA^2)t_{int}^2 t_{conf}^2]^{1/2}}{-2(1 - NA^2)}\right\}^{1/2}$$

where NA represents numerical aperture of the dispersing lens; $d_{conf1}$ and $d_{conf2}$ represent confocal depths of front and rear surfaces of the sample to be tested, respectively; $d_{int1}$ and $d_{int2}$ represent optical depths of the front and rear surfaces of the sample to be tested, respectively; and $t_{conf}$ represents the confocal thickness of the sample to be tested.

The present application has at least the following beneficial effects.

The optical fiber-typed spectral confocal coherence tomography optical system described in the present application allows for two spectral acquisitions during a single measurement by controlling the opening and closing of the light shutter: when the light shutter is opened, the total output signal formed by the superposition of the spectral confocal signal and the interference signal is acquired; and when the light shutter is closed, only the spectral confocal signal is acquired. By dividing the two signals, the interference signal can be obtained. Compared with the conventional filtering method, the system of the present application can effectively improve the signal-to-noise ratio of signals. Additionally, although the introduction of the spectral confocal signal reduces the bandwidth of the interference signal by an order of magnitude, and the tomographic resolution after processing is reduced to nearly one-tenth of the light source bandwidth, its signal model is significantly simplified compared to spectral-domain OCT, and is merely the superposition of two cosine signals with different frequencies. Meanwhile, in the present application, the conventional Fourier transform method is replaced with the covariance method, a typical parametric spectrum estimation method, to achieve high-resolution estimation through signal model fitting and autocorrelation calculation. Compared with the conventional filtering method, the present application can effectively improve the resolution of the frequency-domain interference signal.

BRIEF DESCRIPTION OF THE DRAWINGS

To describe the technical solutions in the examples of the present application more clearly, the accompanying drawings required in the examples are briefly described below. It is to be understood that the accompanying drawings below show merely some examples of the present application, and are not to be deemed as limiting the scope. Those of ordinary skill in the art can also derive other accompanying drawings according to these accompanying drawings without creative efforts.

DETAILED DESCRIPTION

Those skilled in the art can understand that modules in a device of the implementation scenario can be distributed within the device in the implementation scenario, or can be changed accordingly and located in one or more devices in an implementation scenario different from the present implementation scenario. The modules of the aforementioned implementation scenario can be merged into a single module or further divided into multiple sub-modules.

For detailed description of the present application, the following examples are specifically provided to describe the technical solutions of the present application in detail by reference to the accompanying drawings.

Specific Example I

Figure 1:
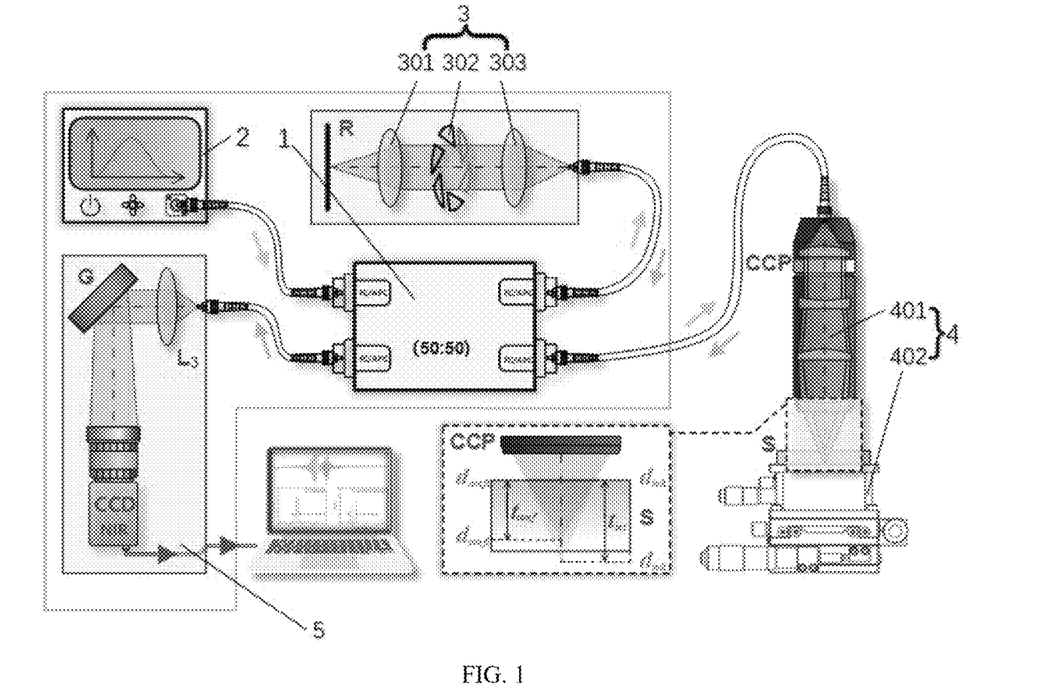
FIG. 1 is a schematic diagram of a system according to the present application.

The present application provides an example:

As shown in FIG. 1, an optical fiber-typed spectral confocal coherence tomography optical system of the present application includes an optical fiber coupler 1, a broadband light source 2, a reference component 3, a sample component 4 and a spectrometer 5. The broadband light source 2 is connected to an input end of the optical fiber coupler 1, for providing a light source signal. The reference component 3 is connected to a first output end of the optical fiber coupler 1, for receiving the light source signal emitted by the optical fiber coupler 1 and controllably forming the light source signal into an interference signal. The sample component 4 is connected to a second output end of the optical fiber coupler 1, for receiving the light source signal emitted by the optical fiber coupler 1 and forming a spectral confocal signal after the light source signal passes through a sample to be tested 6. The spectrometer 5 is connected to a third output end of the optical fiber coupler 1, for firstly receiving the spectral confocal signal, then receiving a total output signal obtained from the superposition of the interference signal and the spectral confocal signal, and achieving signal separation according to the spectral confocal signal and the total output signal to enhance a signal-to-noise ratio and resolution. In the system of this example, a light path of a sensor in a free space is improved to an optical fiber sensor, enhancing flexibility, portability, and light path stability, thereby increasing its practical value. As shown in FIG. 1, the spectrometer 5 can be connected to a personal computer (PC) for displaying various curves.

The reference component 3 includes a first lens 301, a light shutter 302, and a second lens 303. The first lens 301 is arranged near the first output end of the optical fiber coupler 1, for receiving the light source signal. The light shutter 302 is arranged at an end of the first lens 301 away from the first output end of the optical fiber coupler 1, for controllable closing/opening. The second lens 303 is arranged at an end of the light shutter 302 away from the first lens 301, for outputting the interference signal when the light shutter 302 is opened.

It is to be noted that the opening and closing of the light shutter 302 can be controlled by pulse signals, which belongs to the prior art and will not be described herein.

The sample component 4 includes a dispersing lens 401 and a movable platform 402. The dispersing lens 401 is arranged near the second output end of the optical fiber coupler 1, for receiving the light source signal. The movable platform 402 is arranged at an end away from the dispersing lens 401, for holding the sample to be tested 6 and displacing the sample to be tested 6 along an axial direction of the dispersing lens 401.

In FIG. 1, portion S represents a cross section of the sample to be tested; $d_{conf1}$ and $d_{conf2}$ represent confocal depths of front and rear surfaces of the sample, respectively; $d_{int1}$ and $d_{int2}$ represent optical depths of the front and rear surfaces of the sample to be tested, respectively; $t_{conf}$ represents a confocal thickness of the sample; and $t_{int}$ represents an optical thickness of the sample. When the light shutter 302 is opened, the signal collected by the spectrometer 5 is obtained from the superposition of the spectral confocal signal and the chromatographic interference signal, which can be expressed as:

$$I_o(\lambda) = \sum_{j=1}^{M} \left[ \frac{\pi a^2}{\lambda(d_{conf0} + b\lambda_j)} \mathrm{sinc}\left( \frac{\pi a^2 b(\lambda - \lambda_j)}{2\lambda(d_{conf0} + b\lambda_j)^2} \right) \right]^4 \times \quad (1)$$
$$2\sum_{j=1}^{M} \sqrt{I_R I_j} \cos\left( \phi_{j0} + \frac{4\pi}{\lambda} d_{intj} \right),$$

where $I_o$ represents a total input signal; $\lambda$ represents a wavelength; M represents the number of surfaces of the sample to be tested, and M=2 in the sample thickness measurement in the cross section of sample as shown in FIG. 1; j represents a $j_{th}$ surface of the sample to be tested; $d_{conf0}$, a and b represent parameters related to chromatic confocal probe (CCP) of a dispersing lens, and according to the spectral confocal principle, there is a linear relationship between the confocal depth and wavelength: $d_{conf}(\lambda) = b\lambda + d_{conf0}$; $d_{conf0}$ represents an intercept of the dispersing lens; a represents an aperture size of a confocal pinhole of the dispersing lens; b represents a slope of the dispersing lens; $\lambda_j$ represents a wavelength corresponding to the $j_{th}$ surface; $I_R$ and $I_j$ represent intensities of light reflected from a reference surface and a surface of the sample surface to be tested, respectively; $\phi_{j0}$ represents an initial phase of the interference signal; and $d_{intj}$ represents an optical depth corresponding to the $j_{th}$ surface of the sample.

In Formula (1), the left side of the multiplication sign represents the spectral confocal signal, as shown in Formula (2). Since the number of surfaces of the sample to be tested is M=2, this signal is a low-frequency signal formed by the superposition of two sinc functions, and two peaks of the signal correspond to wavelengths $\lambda_1$ and $\lambda_2$, respectively.

$$I_o(\lambda) = \sum_{j=1}^{M} \left[ \frac{\pi a^2}{\lambda(d_{conf0} + b\lambda_j)} \mathrm{sinc}\left( \frac{\pi a^2 b(\lambda - \lambda_j)}{2\lambda(d_{conf0} + b\lambda_j)^2} \right) \right]^4. \quad (2)$$

The right side represents the interference signal. After being subjected to Fourier transform along a wavenumber k axis, this signal has a frequency of $f_k = d_{intj}/p$. Therefore, this signal is a periodic signal with a frequency higher than the confocal signal, with two peak frequencies present in amplitude-frequency characteristic: $f_{k1}$ and $f_{k2}$, which correspond to the optical depths $d_{int1}$ and $d_{int2}$ of the front and rear surfaces of the tested sample, respectively. Therefore, using the filtering method of the "CCCT system" in the prior art, a superimposed signal of a low-frequency confocal signal and a high-frequency interference signal can be obtained through a single shot; a confocal signal is obtained by low-pass filtering of the superimposed signal; the interference signal is obtained by high-pass filtering of the confocal signal; and the interference signal is subjected to Fourier transform to obtain its amplitude-frequency characteristic.

In this example, considering the resolution and signal-to-noise ratio, the design of controlling the light shutter 302 is employed to collect spectral signal once more by closing the reference signal channel. The signal is separated using a "two-spectral-acquisition" method, and by closing the reference signal channel, the spectral confocal signal $I_c$ can be directly collected, and the interference signal is obtained by dividing the total output signal $I_o$ by the spectral confocal signal $I_c$, achieving signal separation.

Figure 3A:
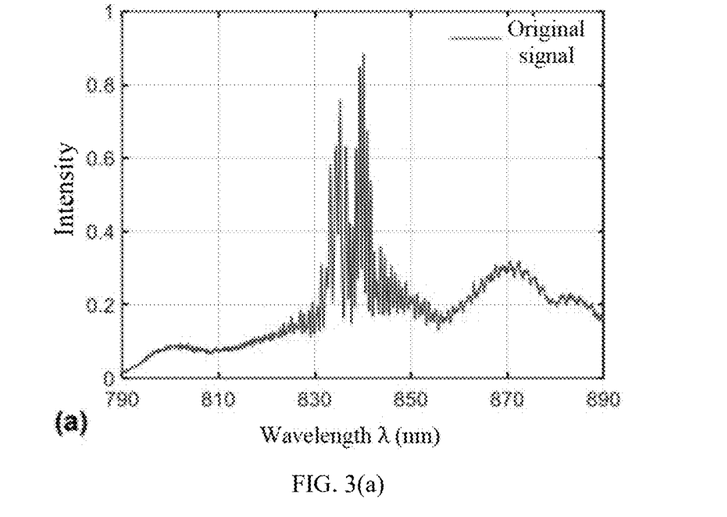
FIG. 3(a) is the spectrum $I_o(\lambda)$ using the method of optical shutter when the optical shutter is open.

Using the system of this example, a spectral signal is collected from a PVC thin film sample with a nominal thickness of 0.1 mm, as shown in FIG. 3(a). The low-frequency and high-frequency portions of this signal are separated using the filtering method to obtain the confocal signal and the interference spectral signal, respectively. The interference signal is subjected to Fourier transform to obtain a frequency domain signal. It can be seen from the results that the peak wavelengths $\lambda_1$ and $\lambda_2$ can be identified from the spectral-domain confocal signal, and the peak frequencies $f_1$ and $f_2$ can be identified from the frequency-domain interference signal, but the signal-to-noise ratio of the two signals is lower, which ultimately affects the measurement results of the measured thickness and refractive index.

Figure 2A:
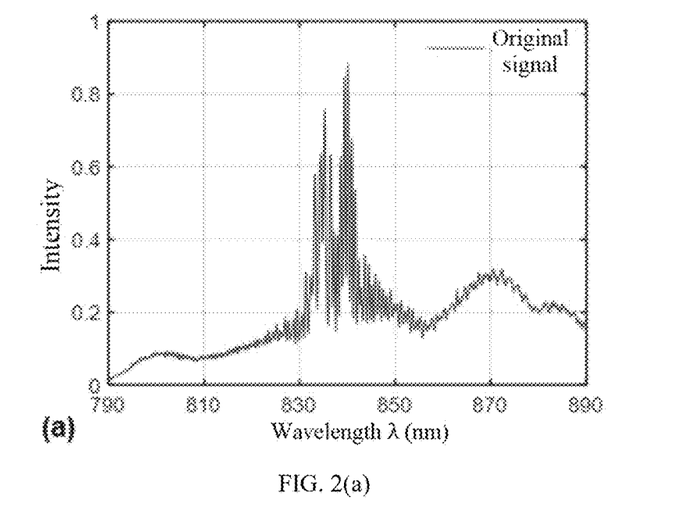
FIG. 2(a) is the spectrum $I_o(\lambda)$ using the conventional filtering method when the optical shutter is open.
Figure 2B:
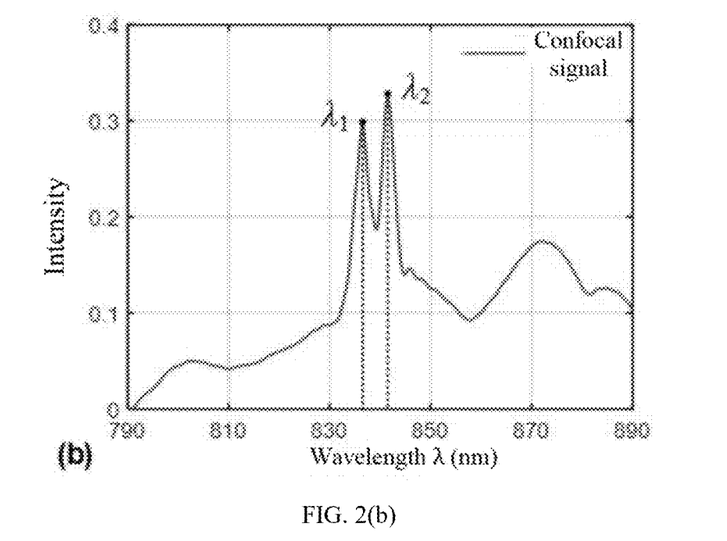
FIG. 2(b) is the separated confocal signal by using low-pass filter.
Figure 2C:
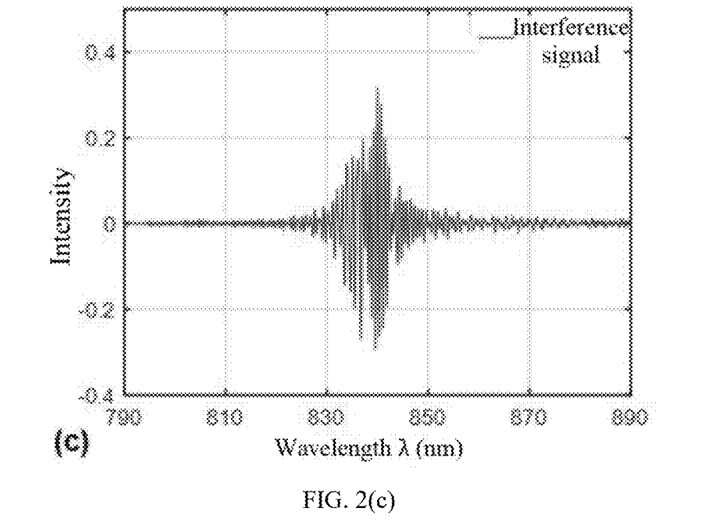
FIG. 2(c) is the separated interference signal by using high-pass filter.
Figure 2D:
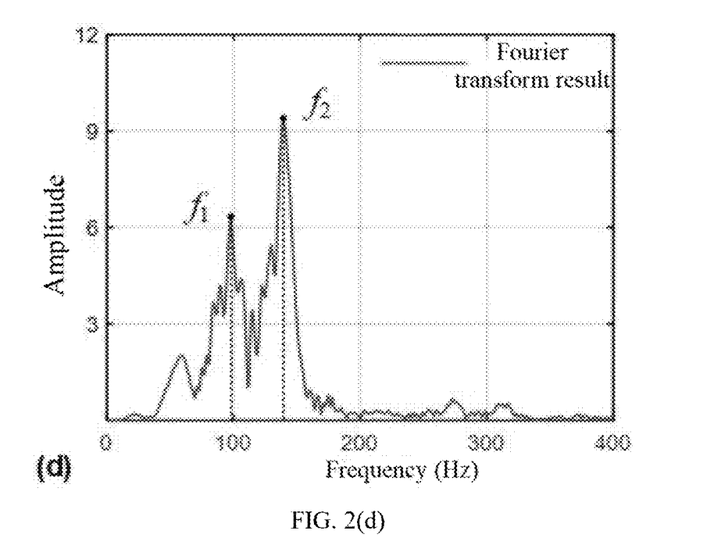
FIG. 2(d) is the amplitude-frequency characteristic of the interference signal using the Fourier transform.
Figure 3B:
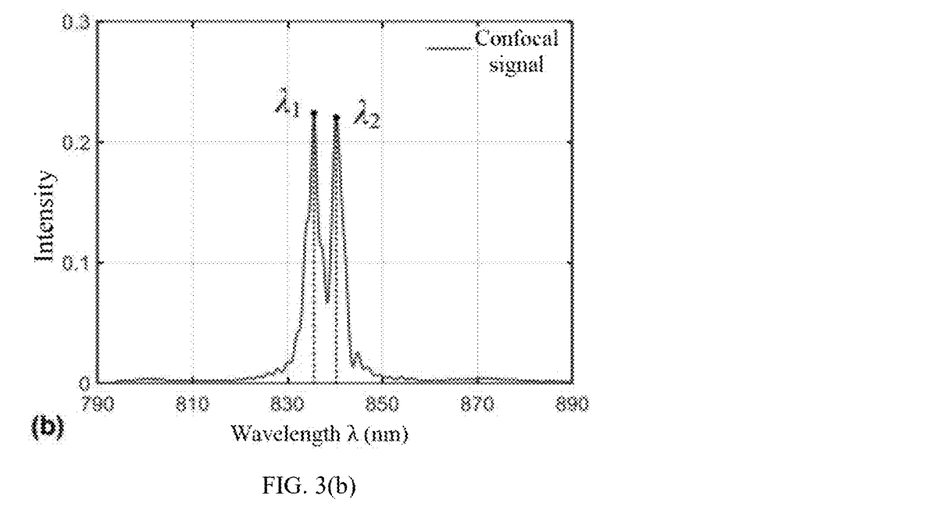
FIG. 3(b) is the confocal signal when the optical shutter is close.
Figure 3C:
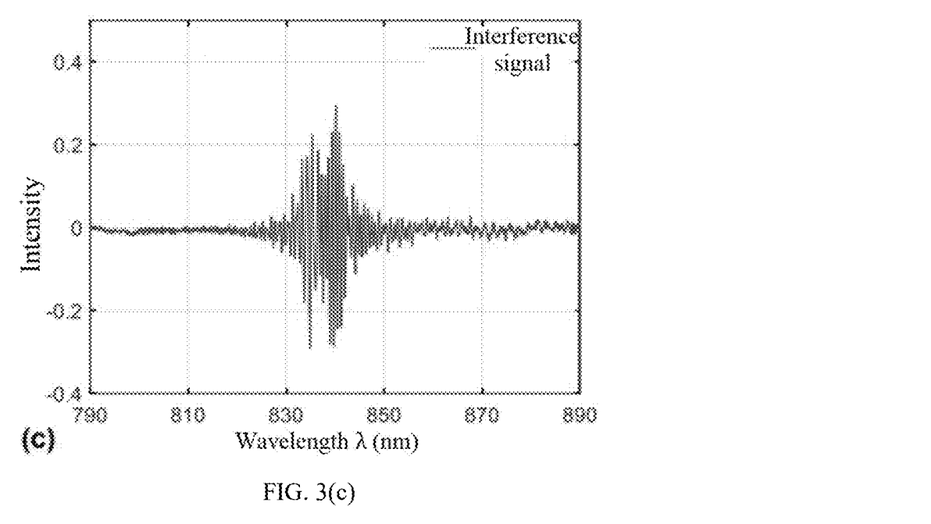
FIG. 3(c) is the separated interference signal using the method of optical shutter.
Figure 3D:
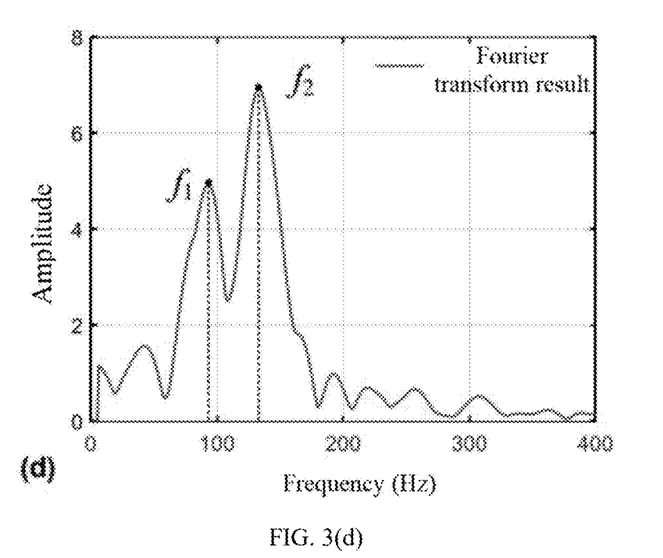
FIG. 3(d) is the amplitude-frequency characteristic of the interference signal using the Fourier transform.

In this example, the "two-spectral-acquisition" method is used, i.e., the step of opening or closing the light shutter 302. After closing the reference signal channel, the confocal signal is directly collected, shown in FIG. 3(b), with a 13.6 dB improvement in signal-to-noise ratio compared to the result shown FIG. 2(a). By dividing the original signal shown in FIG. 3(a) and the confocal signal shown in FIG. 3(b), the interference signal shown in FIG. 3(c) can be obtained. The interference signal shown in FIG. 3(c) is subjected to Fourier transform to obtain the frequency-domain signal shown in FIG. 3(d), with an 8.3 dB improvement in signal-to-noise ratio compared to the result shown in FIG. 2(b). As a result, in the optical fiber-typed spectral confocal coherence tomography optical system of this example, using the "two-spectral-acquisition" method, although an extra spectral acquisition is added during the measurement, the signal quality is significantly improved.

Figure 4:
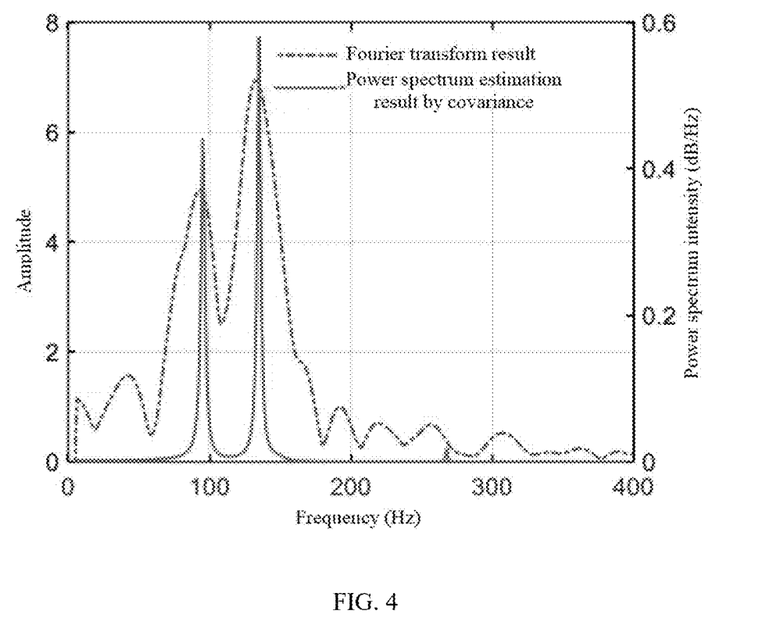
FIG. 4 shows the comparison between Fourier transform and covariance method.

The optical fiber-typed spectral confocal coherence tomography optical system of this example improves the signal-to-noise ratio using "two-spectral-acquisition" method. Considering the dual-frequency characteristics of the spectral confocal coherence tomography signal, a parametric spectrum estimation method instead of conventional Fourier transform method can be employed to further improve frequency resolution. As a typical parametric spectrum estimation method, the covariance method, using signal model fitting and autocorrelation calculation, can obtain a significantly superior frequency resolution than Fourier transform in dual-frequency signal estimation. Therefore, this method is introduced into the frequency estimation step of signal processing. The frequency spectrum of the interference signal shown in FIG. 3(c) is estimated using Fourier transform and covariance methods separately, with the results shown in FIG. 4. It can be seen obviously that using the covariance method effectively improves the problem of decreased frequency resolution due to insufficient effective observation points and significantly enhances the signal-to-noise ratio of signals.

Figure 5A:
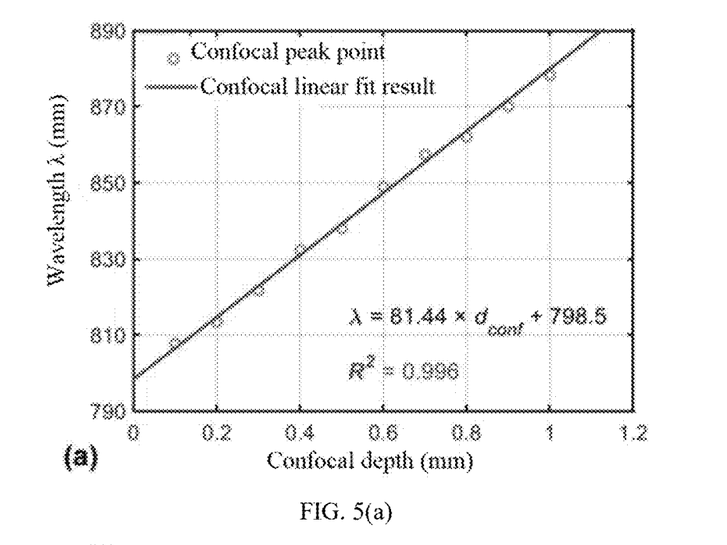
FIG. 5(a) is the linear fit of the confocal result.
Figure 5B:
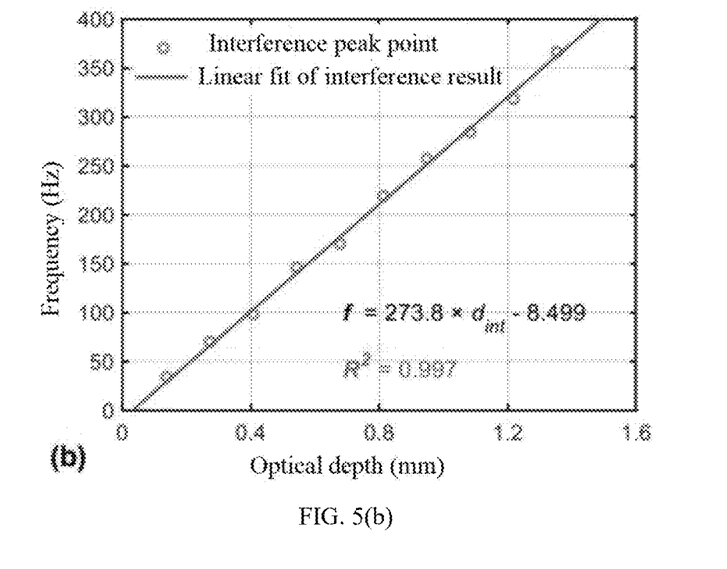
FIG. 5(b) is the linear fit of the interference result.

To determine the linear relationship between confocal depth and wavelength, and the linear relationship between interference frequency and optical depth in the optical fiber-typed spectral confocal coherence tomography optical system of this example, the movable platform 402 in the system is further utilized to perform calibration. The resolution of the movable platform 402 is 10 μm. During the calibration, the movable platform 402 is allowed to produce 10 axial displacements with a step size of 100 μm, and the signal of the front surface of the tested film after each displacement is recorded and analyzed, and calibration results as shown in FIG. 5(a) and FIG. 5(b) can be obtained.

The "o" in the figures represents measured values at different depths, exhibiting clear linear characteristics. After linear fitting, straight lines shown in FIG. 5(a) and FIG. 5(b) can be obtained, with coefficients of determination $R^2$ of 0.996 and 0.997, respectively. Based on the linear fitting results, the actual relationship between confocal depth and wavelength can be calculated as $d_{conf}=0.01226'\lambda-9.790$, and the actual relationship between interference frequency and optical depth as $d_{int}=0.005403'f+0.04625$.

In summary, in the system of this example, a light path of a sensor in the free space is improved to an optical fiber sensor, enhancing flexibility, portability, and light path stability, thereby increasing its practical value. Moreover, the optical system structure of the system in the present application involves some specialized optical devices as follows.

Dispersing lens 401: the design and selection of the optical fiber-typed dispersing lens in this system determine the depth range and resolution of the spectral confocal signal, and the depth range and resolution are required to correspond to the depth range and resolution of the interference signal.

Spectrometer 5: to ensure the intensity and continuity of the light source, a superluminescent diode is typically used as the light source, but its bandwidth is usually difficult to exceed 100 nm, so a high-resolution fiber-optic spectrometer corresponding to the bandwidth needs to be designed.

Light shutter 302: to provide a high-quality signal reconstruction method for "two-spectral-acquisition", improved design is made to the hardware, with a light shutter added to the reference arm to control the on/off state of the reference signal.

Improvement in signal-to-noise ratio: although conventional filtering method can also allow for separation of spectral signals and interference signals, the results obtained through the filtering method described in the technical solution show a low signal-to-noise ratio, affecting the thickness and refractive index measurement results of the sensor. In this example, the on/off state of the light shutter 302 in the reference component is controlled, improving the original single spectral acquisition to two spectral acquisitions. Although this system reduces measurement speed to some extent, by comparing the two results as described above, it significantly improves the signal-to-noise ratio, providing an effective solution for acquiring high-quality signals.

Improvement in signal resolution: since this sensor is a combination of spectral confocal technology and spectral-domain OCT technology, the spectral-domain OCT results require converting signals from spectral domain to frequency domain, so that fast Fourier transform (FFT) is employed for transformation in conventional methods. However, the introduction of the confocal signal narrows the bandwidth of the interference signal by an order of magnitude, resulting in a decrease in the tomographic resolution after processing to nearly one-tenth of the light source bandwidth. This system utilizes the prior information that the interference signal is two cosine signals with different frequencies, and replaces the conventional Fourier transform method with the covariance method, a typical parametric spectrum estimation method, to achieve high-resolution frequency estimation through signal model fitting and autocorrelation calculation without affecting other performances of the sensor.

Specific Example II

The present application provides another example:
An application of the optical fiber-typed spectral confocal coherence tomography optical system as described in Specific Example I includes: utilizing the opening and closing of the light shutter 302 in the reference component 3 to obtain the total output signal/the spectral confocal signal, respectively; obtaining the interference signal by dividing the total output signal by the spectral confocal signal, achieving signal separation; and obtaining the confocal thickness and optical thickness of the sample to be tested by peak searching in a wavenumber domain of the spectral confocal signal and a frequency domain of the interference signal, and then obtaining a physical thickness and refractive index of the sample to be tested.

The application includes: setting the confocal thickness as $t_{conf}=d_{conf2}-d_{conf1}$ and the optical thickness as $t_{int}=d_{int1}-d_{int2}$ for the sample to be tested; and obtaining the physical thickness t and refractive index n of the sample to be tested according to the physical relationship expressed in the following formula:

$$t = \left\{ \frac{NA^2 t_{conf}^2 - [NA^4 t_{conf}^4 + 4(1-NA^2)t_{int}^2 t_{conf}^2]^{1/2}}{-2(1-NA^2)} \right\}^{1/2}, \quad (3)$$

where NA represents numerical aperture of the dispersing lens; $d_{conf1}$ and $d_{conf2}$ represent confocal depths of front and rear surfaces of the sample to be tested, respectively; $d_{int1}$ and $d_{int2}$ represent optical depths of the front and rear surfaces of the sample to be tested, respectively; and $t_{conf}$ represents the confocal thickness of the sample to be tested.

Specific Application Example

Figure 6A:
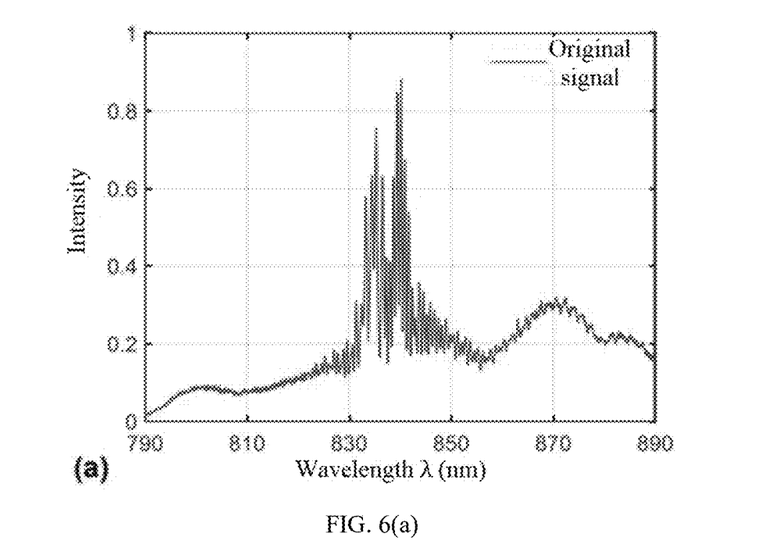
FIG. 6(a) is the spectrum $I_o(\lambda)$ using the method of optical shutter when the optical shutter is open.
Figure 6B:
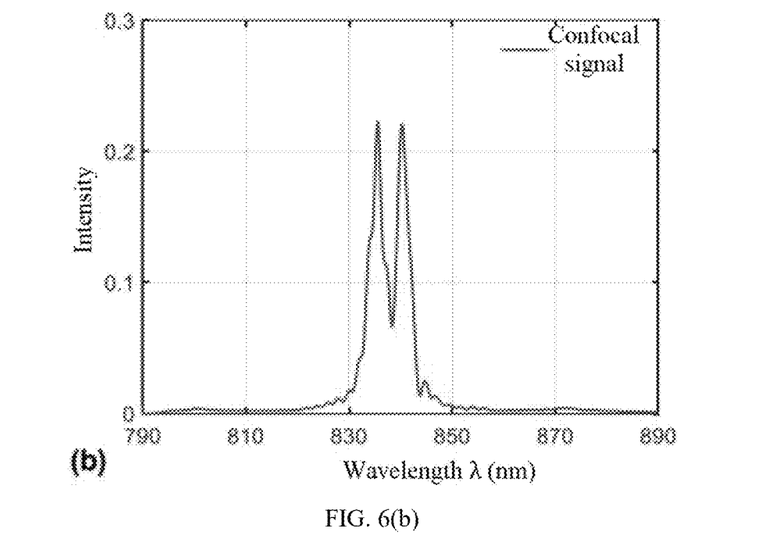
FIG. 6(b) is the confocal signal when the optical shutter is close.
Figure 6C:
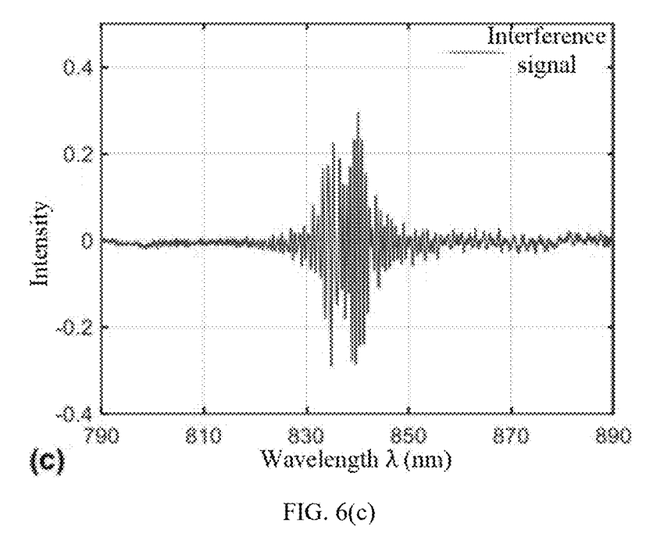
FIG. 6(c) is the separated interference signal using the method of optical shutter.
Figure 6D:
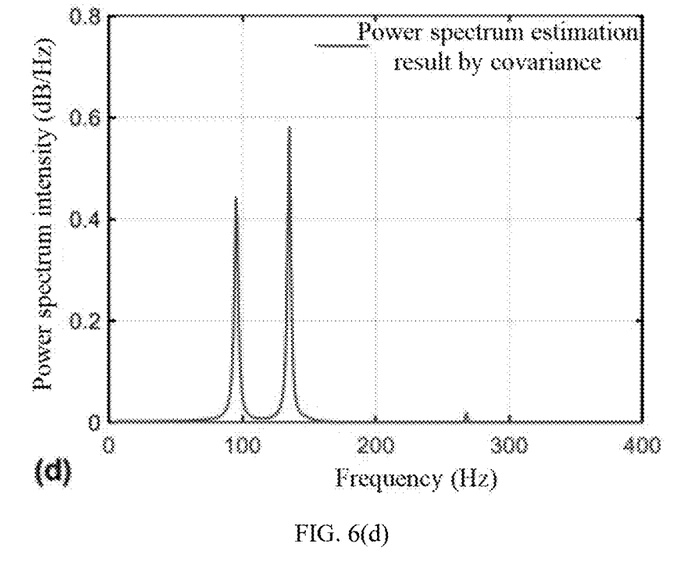
FIG. 6(d) is the power spectral estimation result by the covariance method.

A sample to be tested is placed under the dispersing lens 401 and on the movable platform 402, and spectral signals are collected by the spectrometer 5. When the reference signal channel of the light shutter 302 is opened, the total output signal as shown in FIG. 6(a) can be obtained. When the reference signal channel of the light shutter 302 is closed, the spectral confocal signal can be directly collected, as shown in FIG. 6(b). According to Formula (1), the interference signal can be obtained, as shown in FIG. 6(c). After performing power spectral density estimation on the interference signal, the frequency estimation result as shown in FIG. 6(d) can be obtained.

Figure 7A:
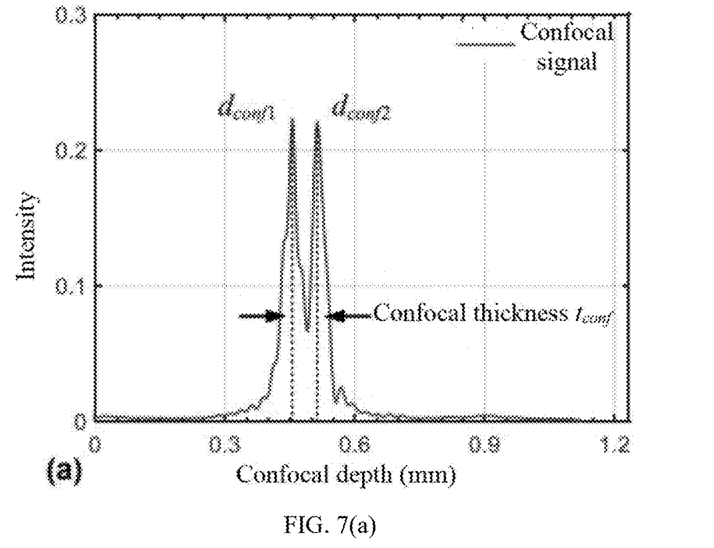
FIG. 7(a) is the confocal thickness of the measurement results of a polyvinylchloride (PVC) film with nominal thickness of 0.10 mm.
Figure 7B:
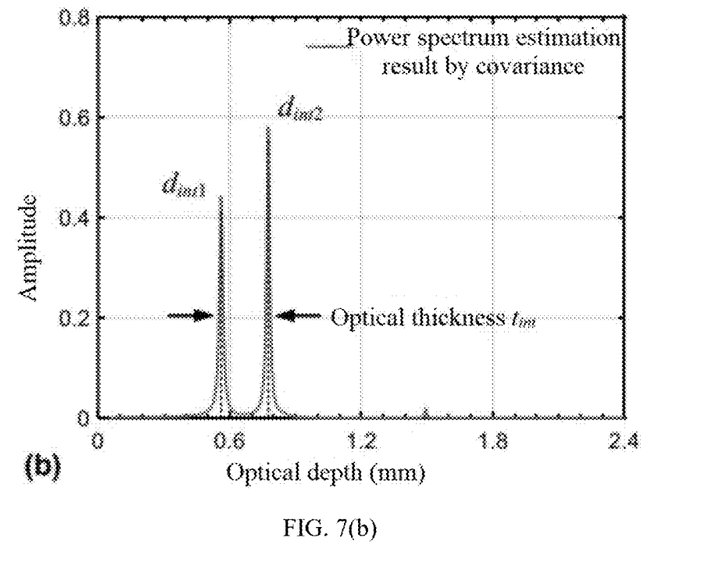
FIG. 7(b) is the optical thickness of the measurement results of a PVC film with nominal thickness of 0.10 mm.

According to the collected spectral confocal signal and the peak positions after Fourier transform of the interference signal, and combining with their respective calibration curves, the confocal depths $d_{conf1}$ and $d_{conf2}$, and the optical depths $d_{int1}$ and $d_{int2}$ of the front and rear surfaces of the sample to be tested can be determined, as shown in FIGS. 7a-7b. By calculating the confocal and optical thicknesses, and combining with Formula (3), the physical geometric thickness of the sample to be tested can be obtained, and further, the refractive index of the sample can be calculated. FIGS. 7a-7b show the results after Fourier transform of the collected spectral confocal signal and interference signal, with the confocal and optical thicknesses of 0.057 mm and 0.146 mm, respectively. The calculated geometric thickness and refractive index are 0.092 mm and 1.587, respectively.

Figure 8:
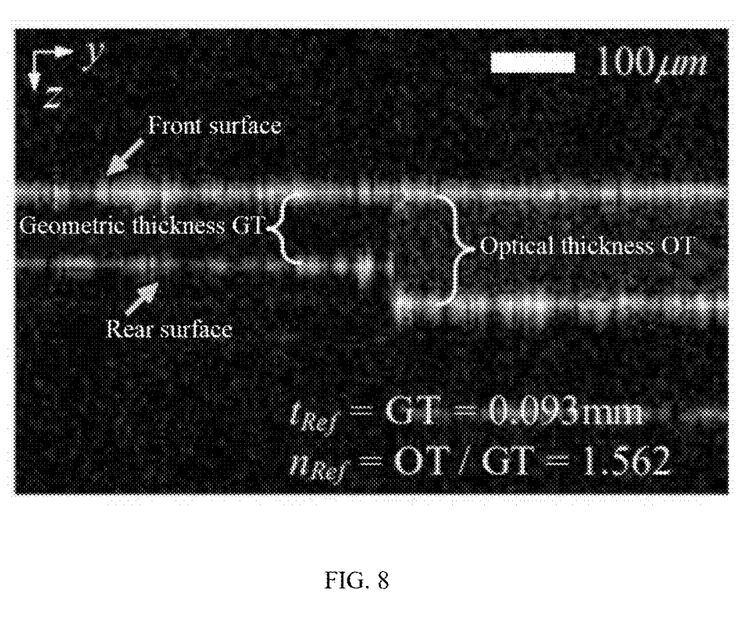
FIG. 8 shows the accuracy verification of the measurement by the system according to the present application.

Combining with the refractive index measurement method described in the literature "determination of the refractive index of highly scattering human tissue by optical coherence tomography", and comparing the measurement results of a commercial B-scan spectral-domain OCT system (OQLabScope 2.0), as shown in FIG. 8, $t_{Ref}$=0.093 mm and $n_{Ref}$=1.562 are taken as reference values, which are compared with the geometric thickness and refractive index obtained by the built measurement system, it is found that the errors are 1.08% and 1.60%, respectively, indicating that the system of the present application has higher measurement accuracy.

The above disclosed is only some specific implementation scenarios of the present application, but the present application is not limited to this. Any variations that can be thought of by any skilled in the art are to be included in the scope of protection of the present application. The serial numbers mentioned above in the present application are solely for descriptive purposes, rather than indicating the superiority or inferiority of implementation scenarios.

The invention claimed is:

1. An optical fiber spectral confocal coherence tomography optical system, comprising:
    an optical fiber coupler,
    a broadband light source, connected to an input end of the optical fiber coupler, for providing a light source signal,
    a reference component, connected to a first output end of the optical fiber coupler, for receiving the light source signal emitted by the optical fiber coupler and controllably forming the light source signal into an interference signal,
    a sample component, connected to a second output end of the optical fiber coupler, for receiving the light source signal emitted by the optical fiber coupler and forming a spectral confocal signal after the light source signal passes through a sample to be tested, and
    a spectrometer, connected to a third output end of the optical fiber coupler, for firstly receiving the spectral confocal signal, then receiving a total output signal obtained from the superposition of the interference signal and the spectral confocal signal, and achieving signal separation according to the spectral confocal signal and the total output signal to enhance a signal-to-noise ratio and resolution of signals, wherein
    the spectrometer, connected to a third output end of the optical fiber coupler, for firstly receiving the spectral confocal signal, then receiving a total output signal obtained from the superposition of the interference signal and the spectral confocal signal, wherein for achieving signal separation according to the spectral confocal signal and the total output signal, the spectrometer is for:
    broadband light emitted by the broadband light source entering the reference component and the sample component;
    closing a light shutter in the reference component, preventing the broadband light from entering the reference component while allowing the broadband light to only enter the sample component to form the spectral confocal signal;
    opening the light shutter in the reference component, allowing the broadband light to enter the reference component to obtain the interference signal; and
    superimposing the interference signal and the spectral confocal signal to obtain the total output signal, and outputting the total output signal to the spectrometer; the total output signal being expressed as:

$$I_o(\lambda) = \sum_{j=1}^{M} \left[ \frac{\pi a^2}{\lambda(d_{conf0} + b\lambda_j)} \text{sinc}\left( \frac{\pi a^2 b(\lambda - \lambda_j)}{2\lambda(d_{conf0} + b\lambda_j)^2} \right) \right]^4 \times$$

$$2\sum_{j=1}^{M} \sqrt{I_R I_j} \cos\left( \phi_{j0} + \frac{4\pi}{\lambda} d_{intj} \right)$$

where $I_o$ represents the total output signal; $\lambda$ represents a wavelength; M represents the number of surfaces of the sample to be tested; j represents a $j_{th}$ surface of the sample to be tested; $d_{conf0}$, a, and b represent parameters of a dispersing lens; $\lambda_j$ represents a wavelength corresponding to the $j_{th}$ surface of the sample to be tested; $I_R$ and $I_j$ represent intensities of light reflected from a reference surface and a surface of the sample to be tested, respectively; $\phi_{j0}$ represents an initial phase of the interference signal; and $d_{intj}$ represents an optical depth corresponding to a $j_{th}$ surface of the dispersing lens; and wherein for achieving signal separation according to the spectral confocal signal and the total output signal, the spectrometer is for:

using the opening/closing of the light shutter in the reference component to obtain the total output signal/the spectral confocal signal, respectively; and obtaining the interference signal by dividing the total output signal by the spectral confocal signal, and using a covariance method to perform signal model fitting and autocorrelation calculation to achieve high-resolution estimation and signal separation.

2. The optical fiber spectral confocal coherence tomography optical system according to claim 1, wherein the reference component comprises:
    a first lens, arranged near the first output end of the optical fiber coupler, for receiving the light source signal;
    the light shutter, arranged at an end of the first lens away from the first output end of the optical fiber coupler, for controllable closing/opening; and
    a second lens, arranged at an end of the light shutter away from the first lens, for outputting the interference signal when the light shutter is opened.

3. A method of using the optical fiber spectral confocal coherence tomography optical system according to claim 2, comprising:
    using the opening/closing of the light shutter in the reference component to obtain the total output signal/the spectral confocal signal, respectively;
    obtaining the interference signal by dividing the total output signal by the spectral confocal signal to achieve signal separation; and
    obtaining a confocal thickness and an optical thickness of the sample to be tested by peak searching in a wavenumber domain of the spectral confocal signal and a frequency domain of the interference signal, respectively, and obtaining a physical thickness of the sample to be tested.

4. The optical fiber spectral confocal coherence tomography optical system according to claim 1, wherein the sample component comprises:
    a dispersing lens, arranged near the second output end of the optical fiber coupler, for receiving the light source signal; and a movable platform, arranged at an end away from the dispersing lens, for holding the sample to be tested and displacing the sample to be tested along an axial direction of the dispersing lens.

5. A method of using the optical fiber spectral confocal coherence tomography optical system according to claim 4, comprising:

using the opening/closing of the light shutter in the reference component to obtain the total output signal/the spectral confocal signal, respectively;

obtaining the interference signal by dividing the total output signal by the spectral confocal signal to achieve signal separation; and obtaining a confocal thickness and an optical thickness of the sample to be tested by peak searching in a wavenumber domain of the spectral confocal signal and a frequency domain of the interference signal, respectively, and obtaining a physical thickness of the sample to be tested.

6. The optical fiber spectral confocal coherence tomography optical system according to claim 1, wherein an intensity signal of the interference signal is expressed as:

$$2\sum_{j=1}^{M} \sqrt{I_R I_j} \cos\left(\phi_{j0} + \frac{4\pi}{\lambda} d_{intj}\right),$$

where $\lambda$ represents the wavelength; M represents the number of surfaces of the sample to be tested; j represents the $j_{th}$ surface of the sample to be tested; $I_R$ and $I_j$ represent the intensities of the light reflected from the reference surface and the surface of the sample to be tested, respectively; $\phi_{j0}$ is the initial phase of the interference signal; $d_{intj}$ represents the optical depth corresponding to the $j_{th}$ surface of the sample to be tested.

7. A method of using the optical fiber spectral confocal coherence tomography optical system according to claim 6, comprising:

using the opening/closing of the light shutter in the reference component to obtain the total output signal/the spectral confocal signal, respectively;

obtaining the interference signal by dividing the total output signal by the spectral confocal signal to achieve signal separation; and obtaining a confocal thickness and an optical thickness of the sample to be tested by peak searching in a wavenumber domain of the spectral confocal signal and a frequency domain of the interference signal, respectively, and obtaining a physical thickness of the sample to be tested.

8. A method of using the optical fiber spectral confocal coherence tomography optical system according to claim 1, comprising:

using the opening/closing of the light shutter in the reference component to obtain the total output signal/the spectral confocal signal, respectively;

obtaining the interference signal by dividing the total output signal by the spectral confocal signal to achieve signal separation; and obtaining a confocal thickness and an optical thickness of the sample to be tested by peak searching in a wavenumber domain of the spectral confocal signal and a frequency domain of the interference signal, respectively, and obtaining a physical thickness of the sample to be tested.

9. The method according to claim 8, comprising:

setting the confocal thickness as $t_{conf}=d_{conf2}-d_{conf1}$ and the optical thickness as $t_{int}=d_{int1}-d_{int2}$ for the sample to be tested; and obtaining the physical thickness t of the sample to be tested according to the physical relationship expressed in the following formula:

$$t = \left\{ \frac{NA^2 t_{conf}^2 - \left[NA^4 t_{conf}^4 + 4(1-NA^2)t_{int}^2 t_{conf}^2\right]^{1/2}}{-2(1-NA^2)} \right\}^{1/2}$$

where NA represents numerical aperture of the dispersing lens; $d_{conf1}$ and $d_{conf2}$ represent confocal depths of front and rear surfaces of the sample to be tested, respectively; $d_{int1}$ and $d_{int2}$ represent optical depths of the front and rear surfaces of the sample to be tested, respectively; and $t_{conf}$ represents the confocal thickness of the sample to be tested.

* * * * *